United States Patent
Wagoner et al.

(10) Patent No.: US 9,231,509 B2
(45) Date of Patent: Jan. 5, 2016

(54) SYSTEM AND METHOD FOR OPERATING A POWER GENERATION SYSTEM WITHIN A POWER STORAGE/DISCHARGE MODE OR A DYNAMIC BRAKE MODE

(71) Applicant: General Electric Company, Schenectady, NY (US)

(72) Inventors: Robert Gregory Wagoner, Roanoke, VA (US); David Smith, Daleville, VA (US); Ramy Michael Souri, Greer, SC (US)

(73) Assignee: General Electric Company, Schenectady, NY (US)

( * ) Notice: Subject to any disclaimer, the term of this patent is extended or adjusted under 35 U.S.C. 154(b) by 106 days.

(21) Appl. No.: 14/088,730

(22) Filed: Nov. 25, 2013

(65) Prior Publication Data

US 2015/0145251 A1  May 28, 2015

(51) Int. Cl.
| | | |
|---|---|---|
| F03D 9/00 | (2006.01) | |
| H02P 9/08 | (2006.01) | |
| F03D 7/02 | (2006.01) | |
| F03D 9/02 | (2006.01) | |
| H02J 3/38 | (2006.01) | |
| H02K 7/18 | (2006.01) | |

(52) U.S. Cl.
CPC .................. *H02P 9/08* (2013.01); *F03D 7/028* (2013.01); *F03D 7/0272* (2013.01); *F03D 9/02* (2013.01); *H02J 3/386* (2013.01); *H02K 7/183* (2013.01)

(58) Field of Classification Search
USPC ......... 290/44, 55; 700/286, 287, 288; 322/24, 322/44
See application file for complete search history.

(56) References Cited

U.S. PATENT DOCUMENTS

| | | | | |
|---|---|---|---|---|
| 3,305,760 | A * | 2/1967 | Davis et al. ...................... | 363/97 |
| 3,805,143 | A * | 4/1974 | Tauern et al. .................... | 363/88 |
| 4,228,362 | A * | 10/1980 | Jacobs et al. .................... | 290/44 |
| 4,352,049 | A | 9/1982 | Franz, Jr. | |
| 4,695,776 | A * | 9/1987 | Dishner et al. ................... | 318/14 |
| 6,023,137 | A * | 2/2000 | Kumar et al. ............. | 318/400.27 |
| 6,355,987 | B1 * | 3/2002 | Bixel ............................... | 290/52 |
| 6,577,483 | B1 * | 6/2003 | Steicher et al. ................. | 361/90 |

(Continued)

FOREIGN PATENT DOCUMENTS

EP         1909371 A2      4/2008

OTHER PUBLICATIONS

Related U.S. Appl. No. 13/910,519, filed Jun. 5, 2013.

(Continued)

*Primary Examiner* — Julio Gonzalez Ramirez
(74) *Attorney, Agent, or Firm* — Dority & Manning, P.A.

(57) ABSTRACT

In one aspect, a system for operating a power generation system within a battery storage/discharge mode or a dynamic brake mode may generally include a power convertor having a DC link, a switching module coupled to the DC link and a selector switch configured to selectively couple the switching module to one of a storage device or a resistive element of the power generation system. The selector switch may be movable between a first position, wherein the switching module is coupled to the storage device such that power is capable of being directed between the DC link and the storage device via control of the switching module, and a second position, wherein the switching module is coupled to the resistive element such that power is capable of being directed between the DC link and the resistive element via control of the switching module.

20 Claims, 5 Drawing Sheets

(56) References Cited

U.S. PATENT DOCUMENTS

| | | | |
|---|---|---|---|
| 7,102,247 | B2 | 9/2006 | Feddersen |
| 7,164,562 | B2* | 1/2007 | Virtanen ............... 361/20 |
| 7,332,827 | B2 | 2/2008 | Nielsen |
| 7,518,256 | B2 | 4/2009 | Juanarena Saragueta et al. |
| 7,579,702 | B2* | 8/2009 | Park et al. ............ 290/44 |
| 7,786,608 | B2* | 8/2010 | Menke ................. 290/44 |
| 7,859,125 | B2 | 12/2010 | Nielsen et al. |
| 7,939,954 | B2 | 5/2011 | Ruiz Flores et al. |
| 8,093,742 | B2 | 1/2012 | Gupta et al. |
| 8,207,623 | B2 | 6/2012 | Rivas et al. |
| 8,373,293 | B2 | 2/2013 | Engelhardt et al. |
| 2008/0204031 | A1* | 8/2008 | Iwane et al. ........... 324/430 |
| 2009/0008937 | A1 | 1/2009 | Erdman et al. |
| 2009/0079193 | A1* | 3/2009 | Nielsen et al. ......... 290/44 |
| 2011/0101689 | A1 | 5/2011 | Larsen et al. |
| 2011/0140430 | A1 | 6/2011 | Ritter et al. |
| 2011/0215772 | A1 | 9/2011 | Sheng et al. |
| 2012/0217824 | A1 | 8/2012 | Gupta et al. |
| 2015/0043252 | A1* | 2/2015 | Kuang ................ 363/21.16 |

OTHER PUBLICATIONS

European Search Report and Opinion issued in connection with corresponding EP Application No. 14192541 on Apr. 21, 2015.

* cited by examiner

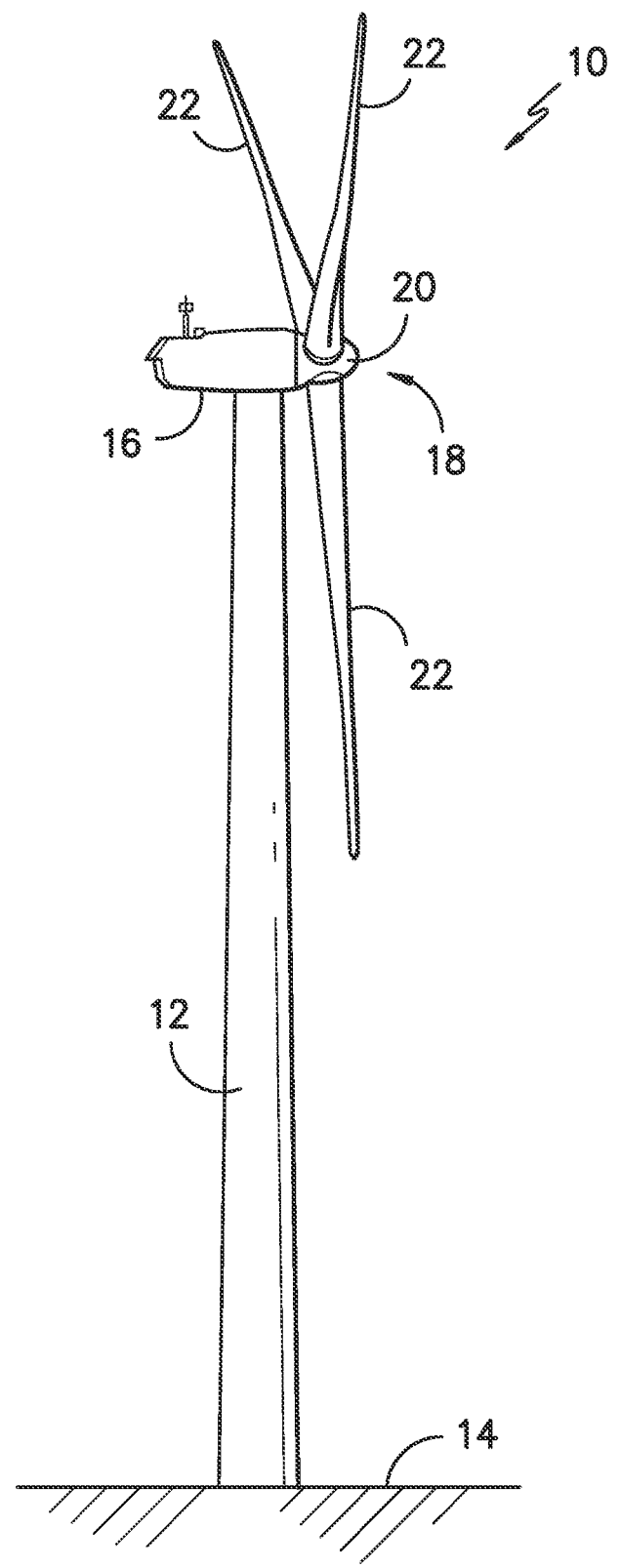
FIG. -1-

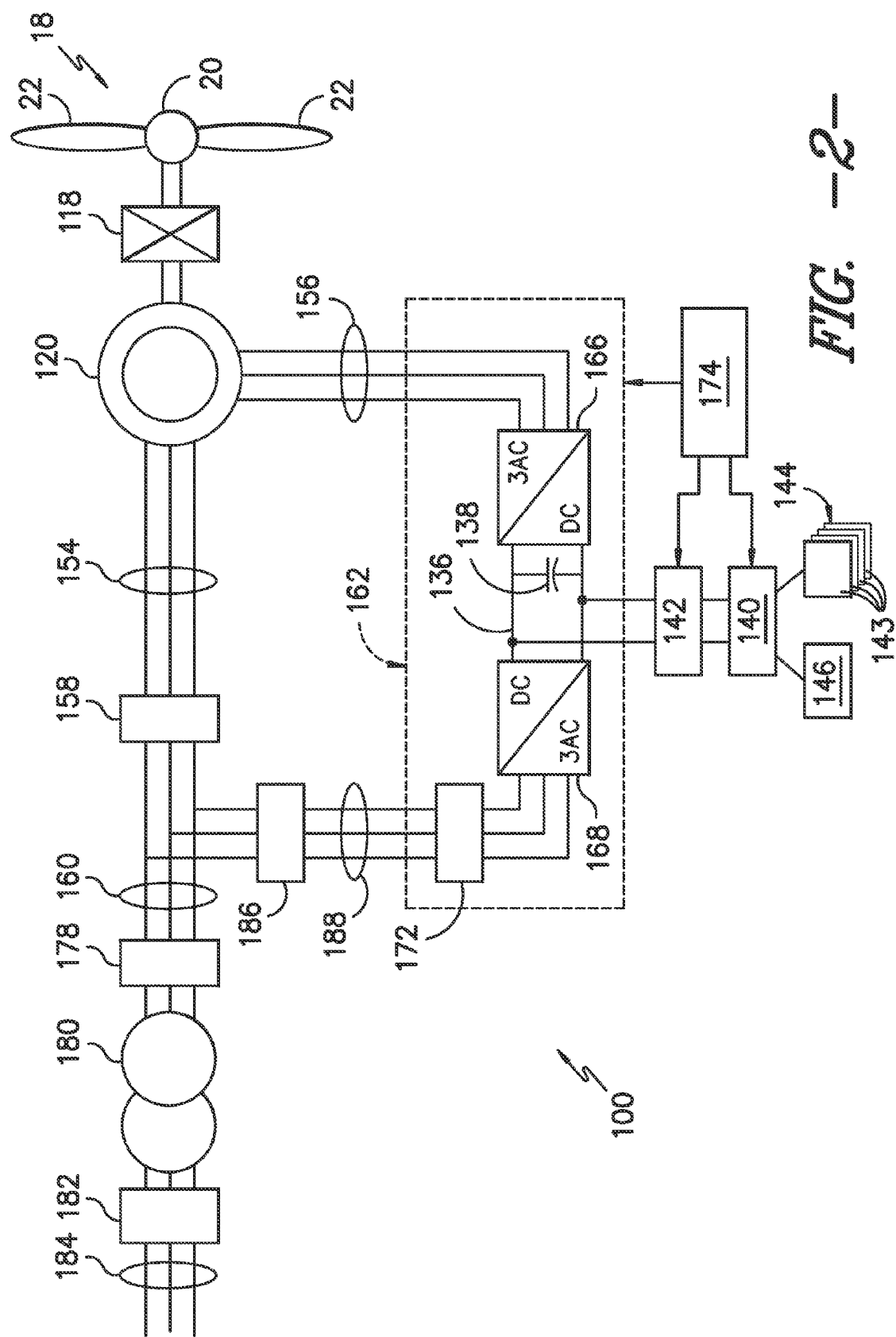
FIG. -2-

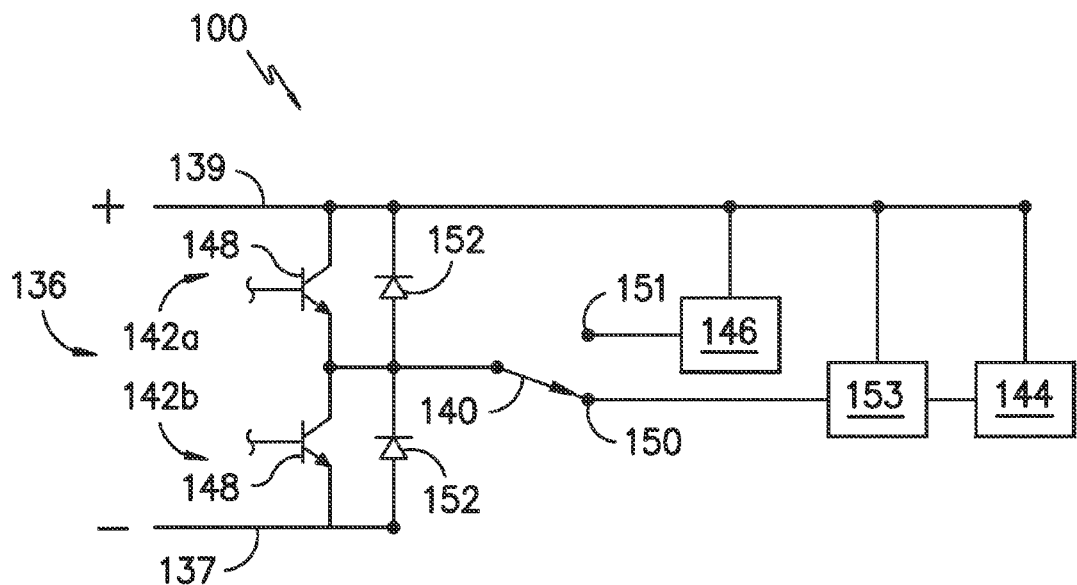
FIG. -3-
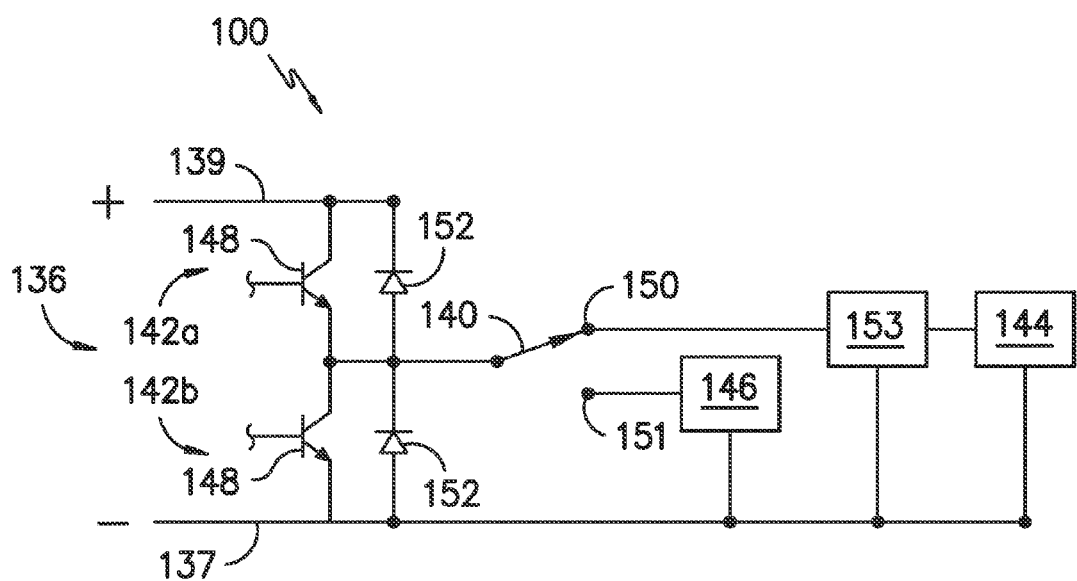
FIG. -4-

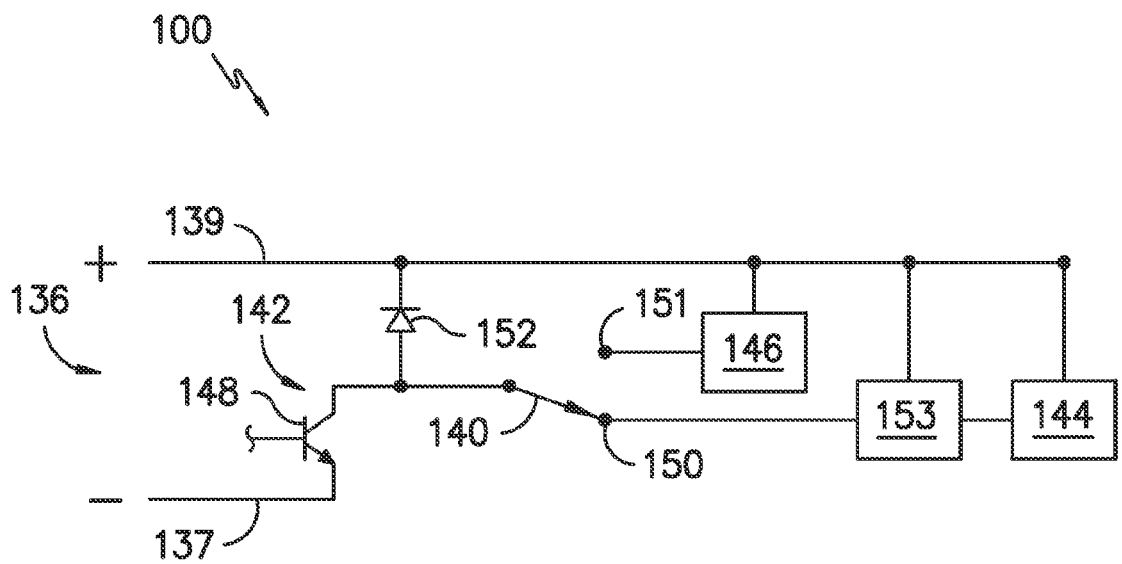
FIG. -5-
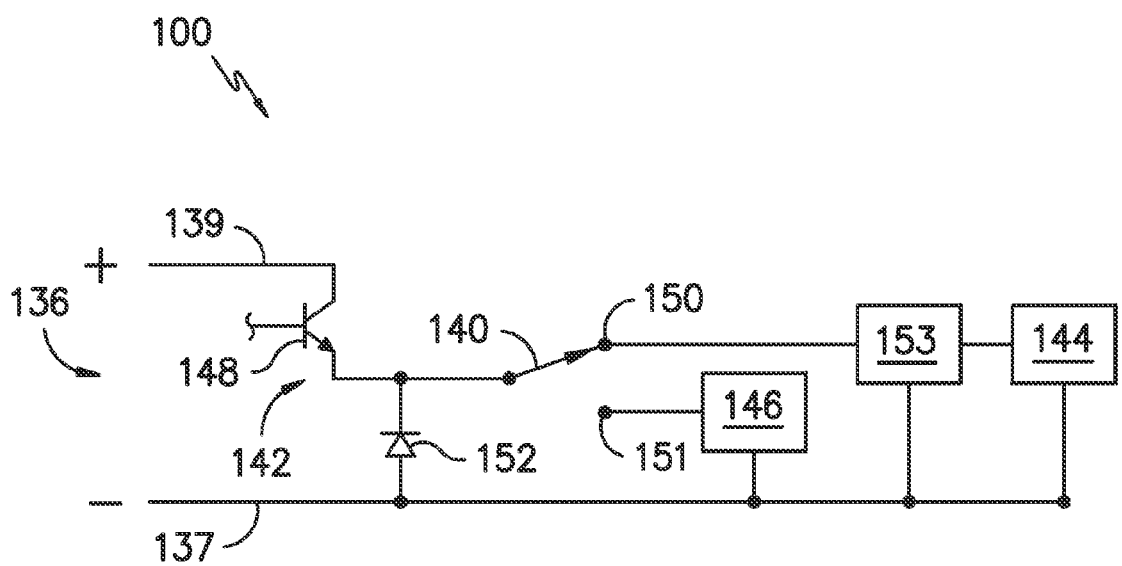
FIG. -6-

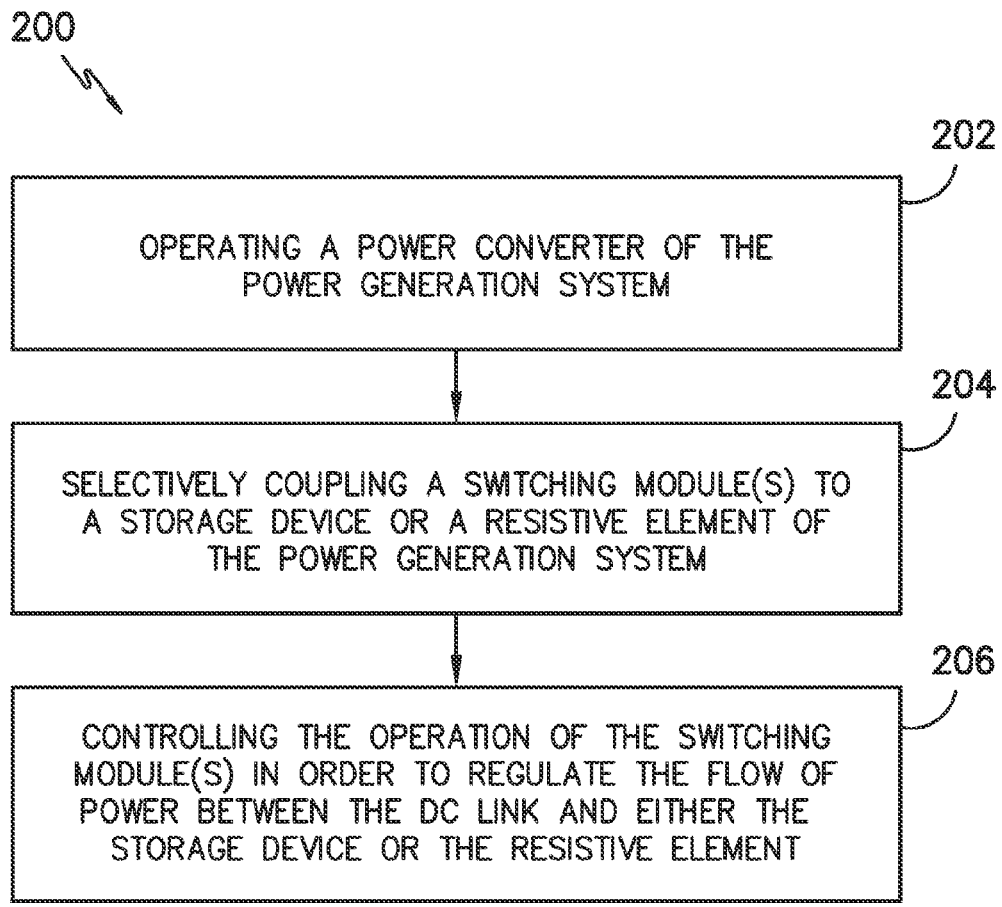
FIG. —7—

SYSTEM AND METHOD FOR OPERATING A POWER GENERATION SYSTEM WITHIN A POWER STORAGE/DISCHARGE MODE OR A DYNAMIC BRAKE MODE

FIELD OF THE INVENTION

The present subject matter relates generally to power generation systems and, more particularly, to a system and method for operating a power generation system within a power storage/discharge mode or a dynamic brake mode.

BACKGROUND OF THE INVENTION

Power generation systems often include a power converter that is configured to convert an input power into a suitable power for application to a load, such as a generator, motor, electrical grid, or other suitable load. For instance, a power generation system, such as a wind turbine system, may include a power converter for converting variable frequency alternating current power generated at the generator into alternating current power at a grid frequency (e.g. 50 Hz or 60 Hz) for application to a utility grid. An exemplary power generation system may generate AC power using a wind-driven doubly fed induction generator (DFIG). A power converter can regulate the flow of electrical power between the DFIG and the grid.

Under certain conditions (e.g., transient power conditions), a high power mismatch between the rotor and the grid connection temporally exists and voltage transients become amplified such that a DC link voltage level can increase above normal allowed or rated levels. Various approaches have been utilized in the past to absorb or deflect power from the DC link during such excessive power level conditions. For example, fast acting shorting means, such as crowbar circuits, have been utilized to limit power flow into the DC link when grid faults or other transient events occur. More recently, dynamic brake systems have been utilized that include a resistor coupled to the DC link via a switch to dissipate power from the DC link. However, while such crowbar circuits and dynamic brakes are useful for preventing overvoltage conditions within the DC link, the power absorbed or deflected from the DC link is lost, thereby reducing the overall efficiency of the power generation system.

Accordingly, a system and method for operating a power generation system that allows power to be both deflected from the DC link during the occurrence of transient events and stored for subsequent discharge back to the DC link would welcomed in the technology. In addition, it would be desirable for the system to be further configured to operate as a dynamic brake when the option for power storage is unavailable to allow power to be dissipated from the DC link during transient events.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for operating a power generation system within a battery storage/discharge mode or a dynamic brake mode. The system may generally include a power convertor having a DC link, a switching module coupled to the DC link and a selector switch configured to selectively couple the switching module to one of a storage device or a resistive element of the power generation system. The selector switch may be movable between a first position, wherein the switching module is coupled to the storage device such that power is capable of being directed between the DC link and the storage device via control of the switching module, and a second position, wherein the switching module is coupled to the resistive element such that power is capable of being directed between the DC link and the resistive element via control of the switching module.

In another aspect, the present subject matter is directed to a method for operating a power generation system within a battery storage/discharge mode or a dynamic brake mode. The method may generally include operating a power converter of the power generation system. The power convertor may include a DC link. The method may also include selectively coupling at least one switching module to one of a storage device or a resistive element of the power generation system. The switching module may be coupled to the DC link. In addition, the method may include controlling the switching module in order to regulate a flow of power between the DC link and either the storage device or the resistive element.

In a further aspect, the present subject matter is directed to a wind turbine system. The wind turbine system may generally include a wind-driven generator and a power convertor coupled to the generator. The power convertor may include a DC link. In addition, the wind turbine system may include a switching module coupled to the DC link and a selector switch configured to selectively couple the switching module to one of a storage device or a resistive element of the wind turbine system. The switching module, when controlled, may be configured to draw power from or transmit power to the DC link; and The selector switch may be movable between a first position, wherein the switching module is coupled to the storage device such that power is capable of being directed between the DC link and the storage device via control of the switching module, and a second position, wherein the switching module is coupled to the resistive element such that power is capable of being directed between the DC link and the resistive element via control of the switching module.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a schematic view of one embodiment of a wind turbine system in accordance with aspects of the present subject matter;

FIG. 3 illustrates a schematic view of one embodiment of an electrical arrangement that may be used for operating the disclosed system within a power storage/discharge mode or a dynamic brake mode in accordance with aspects of the present subject matter;

FIG. 4 illustrates a schematic view of another embodiment of an electrical arrangement that may be used for operating the disclosed system within a power storage/discharge mode or a dynamic brake mode in accordance with aspects of the present subject matter;

FIG. 5 illustrates a schematic view of a further embodiment of an electrical arrangement that may be used for operating the disclosed system within a power storage/discharge mode or a dynamic brake mode in accordance with aspects of the present subject matter;

FIG. 6 illustrates a schematic view of yet another embodiment of an electrical arrangement that may be used for operating the disclosed system within a power storage/discharge mode or a dynamic brake mode in accordance with aspects of the present subject matter; and FIG. 7 illustrates a flow diagram of one embodiment a method for operating a power generation system within a battery storage/discharge mode or a dynamic brake mode.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method operating a power generation system within a power storage/discharge mode or a dynamic brake mode. Specifically, in several embodiments, the system may include a power converter having a DC link and at least one switching module coupled to the DC link. Each switching module(s) may include, for example, a switching element (e.g., an insulated gate bipolar transistor (IGBT)) and a corresponding diode. In addition, the system may include a selector switch for selectively coupling the switching module(s) to one of a storage device (e.g., one or more batteries) or a resistive element (e.g., a resistor). As will be described below, the selector switch may be movable between a first position, wherein the switching module(s) is coupled to the storage device, and a second position, wherein the switching module(s) is coupled to the resistive element. Thus, when the selector switch is moved to the first position, the switching element(s) of the module(s) may be configured to be switched or modulated in a manner that regulates the flow of power between the DC link and the storage device, thereby allowing power to be stored within and/or discharged from the storage device. Similarly, when the selector switch is moved to the second position, the switching element(s) of the module(s) may be configured to be controlled so as to provide an electrical connection between the resistive element and the DC link, thereby providing a dynamic brake for dissipating power from the DC link.

By providing the disclosed selector switch for coupling either the storage device or the resistive element to the switching module(s), the switching element(s) of the module(s) may be configured to serve a dual function. Specifically, when operating in the power storage/discharge mode, the switching element(s) may, in several embodiments, be configured to function as a bi-directional DC-to-DC power converter (e.g. a DC chopper). As such, by modulating the switching element(s), both the power flow to and from the storage device as well as the voltage level may be controlled. For example, when storing power within the storage device, the operation of the switching element(s) may be controlled in a manner that adjusts the voltage to a level appropriate for supplying power to the storage device (e.g., an appropriate voltage level for the battery(ies)). Similarly, when discharging power from the storage device, the operation of the switching element(s) may be controlled in a manner that adjusts the voltage to a level appropriate for supplying the power back to the DC link. Moreover, when operation is switched to the dynamic brake mode, the same switching element(s) may be configured to function as a brake chopper for selectively connecting the resistive element to the DC link.

It should be appreciated that, in several embodiments, the disclosed system may be configured to operate primarily within the power storage/discharge mode, with the dynamic brake mode serving as a back-up operating mode. In such embodiments, power may be transmitted from the DC link to the storage device to reduce DC link peak voltages during transient events (e.g., grid faults), thereby allowing the system to dissipate power from the DC link in a manner similar to that of a dynamic brake. However, if issues or problems exist with the storage device and/or other system components such that it is not desirable or possible to transmit and/or store power within the storage device, the selector switch may be switched to the second position to couple the switching module(s) to the resistive element to a provide a means for dissipating power from the DC link in the event of transient conditions.

Additionally, by storing the power deflected from the DC link within the storage device, the power may be available for discharge back to the DC link whenever necessary. For example, power may be transferred back to the DC link from the storage device to accommodate grid requirements and/or to otherwise supplement the power transmitted through the DC link. In addition, the power stored within the storage device may also be utilized to maintain synchronization of the generator, such as by transferring power from the storage device to the DC link in order to maintain the DC link voltage constant. In wind turbine applications, this may be desirable, for instance, to reduce turbine mechanical loads and drivetrain loads during shutdown of the wind turbine.

It should also be appreciated that, although the present subject matter will generally be described herein with respect to a DFIG wind turbine system, the disclosed system and method may generally be utilized with any suitable wind turbine system, such as a full power conversion wind turbine system. In addition to wind turbine systems, the disclosed system and method may also be utilized with any other suitable power generation systems, such as solar power systems and any other suitable alternative energy systems.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) to permit electrical energy to be produced.

Referring now to FIG. 2, a schematic diagram of one embodiment of a wind turbine system 100 is illustrated in accordance with aspects of the present subject matter. As shown, the rotor 18 of the wind turbine 10 may, optionally, be coupled to a gear box 118, which is, in turn, coupled to a generator 120. In one embodiment, the generator 120 is a doubly fed induction generator (DFIG). Alternatively, the generator 120 may be any other suitable generator known in the art The generator 120 may be coupled to a stator bus 154 and a power converter 162 via a rotor bus 156. The stator bus 154 may provide an output multiphase power (e.g. three-phase power) from a stator of the generator 120 and the rotor bus 156 may provide an output multiphase power (e.g. three-phase power) from a rotor of the generator 120. As shown in FIG. 2, the power converter 162 includes a rotor side converter 166 and a line side converter 168. The generator 120 may be coupled via the rotor bus 156 to the rotor side converter 166. Additionally, the rotor side converter 166 may be coupled to the line side converter 168 which may, in turn, be coupled to a line side bus 188.

In several embodiments, the rotor side converter 166 and the line side converter 168 may be configured for normal operating mode in a three-phase, pulse width modulation (PWM) arrangement using suitable switching elements, such as one or more IGBTs. The rotor side converter 166 and the line side converter 168 may be coupled via a DC link 136 across which is a DC link capacitor 138.

In addition, the power converter 162 may be coupled to a controller 174 in order to control the operation of the rotor side converter 166 and the line side converter 168. In general, the controller 174 may correspond to any suitable computing device and/or any combination of computing devices. For instance, in several embodiments, the controller 174 may include one or more processor(s) and associated memory device(s) configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 174 to perform various functions.

In typical configurations, various line contactors and circuit breakers including, for example, a grid breaker 182 may also be included for isolating the various components as necessary for normal operation of the generator 120 during connection to and disconnection from the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the generator 120 by rotating the rotor 18 is provided via a dual path to the electrical grid 184. The dual paths are defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of generator 120 to provide multi-phase power (e.g. three-phase power) having a frequency maintained substantially at the frequency of the electrical grid 184 (e.g. 50 Hz or 60 Hz). It should be appreciated that the power flow through the converter 162 may be bi-directional and, thus, may be directed from the rotor-side to the line-side or from the line-side to the rotor-side (e.g., when operating at sub-synchronous speeds).

Additionally, various circuit breakers and switches, such as grid breaker 182, system breaker 178, stator sync switch 158, converter breaker 186, and line contactor 172 may be included in the system 100 to connect or disconnect corresponding buses, for example, when current flow is excessive and may damage components of the wind turbine system 100 or for other operational considerations. Additional protection components may also be included in the wind turbine system 100.

Moreover, the power converter 162 may receive control signals from, for instance, the controller 174. The control signals may be based, among other things, on sensed conditions or operating characteristics of the wind turbine system 100. Typically, the control signals provide for control of the operation of the power converter 162. For example, feedback in the form of a sensed speed of the generator 120 may be used to control the conversion of the output power from the rotor bus 156 to maintain a proper and balanced multi-phase (e.g. three-phase) power supply. In particular, the sensed speed may be used as a basis for adjusting the fundamental frequency of the PWM synthesized bridge voltages for the rotor-side converter 166. Additionally, feedback from other sensors may also be used by the controller 174 to control the power converter 162, including, for example, stator and rotor bus voltages, voltages associated with the switching elements and current feedbacks. Using the various forms of feedback information, switching control signals (e.g. gating control commands for the switching elements), stator synchronizing control signals, and circuit breaker signals may be generated.

As shown in FIG. 2, the system 100 may also include a selector switch 140 and one or more switching modules 142 coupled between the selector switch 140 and the DC link 136. In several embodiments, the selector switch 140 may be configured to selectively couple the switching module(s) 142 to a storage device 144 or a resistive element 146 of the system 100. In such embodiments, by coupling the switching module(s) 142 to the storage device 144, the system 100 may be configured to operate within a power storage/discharge mode to allow power to be transmitted between the DC link 136 and the storage device 144 for storage therein and/or discharge therefrom. Similarly, by coupling the switching module(s) 142 to the resistive element 146, the system 100 may be configured to operate within a dynamic brake mode to allow power to be dissipated from the DC link 136.

For example, when operating in the power storage/discharge mode, the switching module(s) 142 may, in several embodiments, be configured to function as a bi-directional DC-to-DC converter (e.g., a DC chopper). Thus, to store power within the storage device 144, a switching element(s) 148 (FIGS. 3-6) of the switching module(s) 142 may be configured to be modulated in a manner that draws power from the DC link 136 and converts the voltage to an appropriate level for charging the storage device 144. Similarly, to discharge power from storage device 144, the switching element(s) 148 of the module(s) 142 may be configured to be modulated in a manner that draws power from the storage device 144 and coverts the voltage to an appropriate level for the DC link 136.

In addition, when operating in the dynamic brake mode, the switching module(s) 142 may be configured to function as a brake chopper. Thus, the switching element(s) 148 of the module(s) 142 may be modulated in a manner that regulates the DC link voltage by selectively connecting the DC link 136 to the resistive element 146, thereby providing a dynamic brake for dissipating power from the DC link 136.

It should be appreciated that the storage device 142 may generally comprise any number of storage elements configured for storing and/or discharging electrical power. For instance, as shown in FIG. 2, in one embodiment, the storage device 142 may include a plurality of batteries 143 forming a large battery bank. Alternatively, the storage device 142 may include a single battery or any other suitable storage element(s). Similarly, it should be appreciated that the resistive element 146 may generally comprise any suitable component that allows electrical energy to be dissipated in the form heat. For example, in one embodiment, the resistive element 146 may be a dynamic brake resistor.

Additionally, as shown in FIG. 2, the controller 174 may, in several embodiments, be communicatively coupled to both the switching module(s) 142 and the selector switch 140 in order to automatically control the operation of each component. In such embodiments, the controller 174 may be configured to transmit suitable control signals (e.g., switching commands) in order to control the operation of the switching module(s) 142 based on the current operating mode of the system 100. For instance, when operating in the power storage/discharge mode, the controller 174 may be configured to transmit suitable control signals to the switching module(s) 142 for controlling the flow of power between the DC link 136 and the storage device 144, such as by controlling the switching module(s) 142 in a manner that draws power from the DC link 136 when necessary to prevent overvoltage conditions and by controlling the switching module(s) 142 in a manner that draws power from the storage device 144 when it is desired to supply power back to the DC link 136. Similarly, when operating in the dynamic brake mode, the controller 174 may be configured to transmit suitable control signals to the switching module(s) 142 in order to regulate the DC link voltage by controlling the connection between the DC link 136 and the resistive element 146.

Additionally, the controller 174 may be configured to transmit suitable control signals (e.g., switching commands) in order to adjust the position of the selector switch 140, thereby toggling the operating mode of the system 100 between the power storage/discharge mode and the dynamic brake mode. As indicated above, in several embodiments, the disclosed system 100 may be configured to transmit power to the storage device 144 as the primary means for regulating the DC link voltage, with the dynamic brake serving a back-up function. In such embodiments, the selector switch 140 may be configured to be positioned (e.g., at a first position 150 (FIGS. 3-6)) so that the switching module(s) 142 are normally coupled to the storage device 144. However, if it is determined that the storage device 144 has failed and/or any other issues exist with transmitting power to the storage device 144, the controller 174 may be configured to transmit a control signal to the selector switch 140 in order to switch the operation of the system 100 to the dynamic brake mode, thereby allowing power to be dissipated, when necessary, from the DC link 136 via the resistive element 146.

As an alternative to automatically controlling the selector switch 140, the switch 140 may be configured to be manually operated. In such an embodiment, if it is determined that the storage device 144 has failed and/or any other issues exist with transmitting power to the storage device 144, a maintenance person or other personnel may be allowed to manually adjust the selector switch 140 in order to switch the system operation to the dynamic brake mode.

Referring now to FIGS. 3-6, schematic views of several different configurations of electrical arrangements for operating the disclosed system 100 within the power storage/discharge mode or the dynamic brake mode are illustrated in accordance with aspects of the present subject matter. As shown in FIGS. 3-6, the selector switch 140 may generally be configured to be moved between a first position (indicated at point 150) associated with the storage device 144 and a second position (indicated at point 151) associated with the resistive element 146. In such an embodiment, by positioning the selector switch 140 at the first position 150, the storage device 144 may be coupled to the switching module(s) 142, thereby allowing power to be directed between the DC link 136 and the storage device 144 by controlling the operation of the switching module(s) 142. Similarly, by positioning the selector switch 140 at the second position 151, the resistive element 146 may be coupled to the switching module(s) 142, thereby allowing power to be dissipated from DC link 136 via the resistive element 146 by controlling the operation of the switching module(s) 142.

Additionally, as indicated above, the system 100 may generally include any number of switching modules 142 coupled between the DC link 136 and the selector switch 142, with each switching module 142 including a switching element 148 (e.g., an IGBT) and an associated diode 152 (e.g., an anti-parallel diode). For example, as shown in FIGS. 3 and 4, the system 100 may include a plurality of switching modules 142 (e.g., a first switching module 142*a* and a second switching module 142*b*) coupled between the DC link 136 and the selector switch 140. Specifically, as shown in FIG. 3, the first and second switching modules 142*a*, 142*b* are coupled between the DC link 126 and the selector switch 140 such that a positive bus 139 of the DC link 136 is applied directly the storage device 144. Alternatively, as shown in FIG. 4, the first and second switching modules 142*a*, 142*b* are coupled between the DC link 126 and the selector switch 140 such that a negative bus 137 of the DC link 136 is applied directly the storage device 144. It should be appreciated that, by configuring the system 100 to include two or more switching modules 142 coupled between the DC link 126 and the selector switch 140, the switching modules 142 may be configured to function as a bi-directional DC-to-DC converter, thereby providing for a bi-directional power flow between the DC link 136 and the storage device 144 for charging and discharging the storage device 144.

Alternatively, as shown in FIGS. 5 and 6, the system 100 may include a single switching module 142 coupled between the DC link 136 and the selector switch 140, such as by coupling the switching element 148 of the module 142 between a negative bus 137 of the DC link 136 and the selector switch 140 (as shown in FIG. 3) or between a positive bus 139 of the DC link 136 and the selector switch 140 (as shown FIG. 4). In such embodiments, the switching module 142 may only be configured to operate as a uni-directional DC-to-DC converter in order provide for power flow from DC link 136 to the storage device 144, thereby allowing the device 144 to be charged.

Moreover as shown in FIGS. 3-6, the disclosed system 100 may also include a filter 153 associated with the storage device 144. The filter 153 may generally be configured to prevent damage to the storage device 144 by filtering out system harmonics and/or any other rapidly changing system parameters. It should be appreciated that the filter 153 may generally correspond to any suitable filter known in the art. For instance, in one embodiment, the filter 152 may comprise a combination inductors, capacitors and/or resistors.

Referring now to FIG. 7, a flow diagram of one embodiment of a method 200 for operating a power generation system within a battery storage/discharge mode or a dynamic brake mode is illustrated in accordance with aspects of the present subject matter. In general, the method 200 will be described herein as being implemented using a wind turbine system, such as the wind turbine system 100 described above with reference to FIGS. 2-6. However, it should be appreciated that the disclosed method 200 may be implemented using any other suitable power generation system that is configured to supply power for application to a load. In addition, although FIG. 7 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

At (202), the method 200 includes operating a power converter of the power generation system. In several embodiments, the power converter may be coupled to a wind-driven generator 120 (e.g., a DFIG) and be configured as a two-stage power converter 162 including a rotor side converter 166 and a line side converter 168 coupled together by a DC link 136. However, in other embodiments, the power converter may be coupled to any other suitable power source and may have any other suitable configuration.

At (204), the method 200 includes selectively coupling at least one switching module to one of a storage device or a resistive element of the power generation system. For example, in several embodiments, the power generation system 100 may include a selector switch 140 and one or more switching modules 142 coupled between the selector switch 140 and the DC link 136 of the power converter 162. In such embodiments, the selector switch 150 may be configured to selectively couple the switching module(s) 142 to the storage device 144 or the resistive element 146, such as by moving the selector switch 140 to either a first position 150 associated with the storage device 144 or a second position 151 associated with the resistive element 146.

At (206), the method 200 includes controlling the operation of the switching module(s) 142 in order to regulate a flow of power between the DC link and either the storage device or the resistive element. For example, as indicated above, when the system 100 is operating in the power storage/discharge mode, the switching module(s) 142 may be controlled in a manner that regulates both the direction of flow and the voltage level of the power flowing between the DC link 136 and the storage device 144. Similarly, when the system 100 is operating in the dynamic brake mode, the switching module(s) 142 may be controlled in a manner that regulates the amount of power dissipated from the DC link 136 by controlling the connection of the DC link 136 to the resistive element 146.

It should be appreciated that, although the present subject matter has been generally described herein with reference to a system 100 capable of operating in both a power storage/discharge mode and a dynamic brake mode, the system 100 may, in alternative embodiments, only be configured to operate within the power storage/discharge mode. In such embodiments, the disclosed switching module(s) 142 may be coupled between the DC link 136 and the storage device 144 without the need for the selector switch 140 and the resistive element 146. The switching module(s) 142 may then be controlled in a manner that allows power to be drawn from the DC link 136 and stored within the storage device 144 during transient events and drawn from the storage device 144 and directed into the DC link 136 when additional power is needed within the DC link 136.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for operating a power generation system within a battery storage/discharge mode or a dynamic brake mode, the system comprising:

a power convertor including a rotor side converter, a line side converter and a DC link coupled between the rotor side and line side converters, the rotor side converter being configured to convert AC power to DC power and the line side converter being configured to convert DC power to AC power;

a selector switch coupled to the DC link; and a switching module coupled between the selector switch and the DC link, the selector switch being configured to selectively couple the switching module to one of a storage device or a resistive element of the power generation system, wherein the selector switch is movable between a first position, wherein the switching module is coupled to the storage device such that power is capable of being directed between the DC link and the storage device via control of the switching module, and a second position, wherein the switching module is coupled to the resistive element such that power is capable of being directed between the DC link and the resistive element via control of the switching module.

2. The system of claim 1, further comprising a plurality of switching modules coupled between the selector switch and the DC link, wherein, when the selector switch is in the first position, the plurality of switching modules are configured to be operated as a bi-directional DC-to-DC converter for controlling the flow of power to and from the storage device.

3. The system of claim 1, wherein, when the selector switch is in the first position, the switching module is configured to be operated as a DC-to-DC converter for controlling the flow of power from the DC link to the storage device.

4. The system of claim 1, wherein, when the selector switch is in the second position, the switching module is configured to be operated as a brake chopper for the resistive element.

5. The system of claim 1, wherein the switching module comprises a switching element coupled between the DC link and the selector switch and a diode associated with the switching element.

6. The system of claim 1, wherein the storage device comprises at least one battery.

7. The system of claim 1, further comprising a filter associated with the storage device.

8. A method for operating a power generation system within a battery storage/discharge mode or a dynamic brake mode, the method comprising:
operating a power converter of the power generation system, the power converter including a rotor side converter, a line side converter and a DC link coupled between the rotor side and line side converters, the rotor side converter being configured to convert AC power to DC power and the line side converter being configured to convert DC power to AC power;
selectively coupling, via a switching switch, a switching module to one of a storage device or a resistive element of the power generation system, the switching module being coupled to between the switching element and the DC link; and
controlling the switching module in order to regulate a flow of power between the DC link and the one of the storage device or the resistive element.

9. The method of claim 8, wherein selectively coupling the switching module to one of the storage device or the resistive element comprises moving the selector switch to a first position in order to couple the switching module to the storage device.

10. The method of claim 9, wherein controlling the switching module in order to regulate the flow of power between the DC link and the one of the storage device or the resistive element comprises controlling the switching module in a manner that either directs power from the DC link to the storage device or from the storage device to the DC link.

11. The method of claim 8, wherein selectively coupling the switching module to one of the storage device or the resistive element comprises moving the selector switch to a second position in order to couple the switching module to the resistive element.

12. The method of claim 11, wherein controlling the switching module in order to regulate the flow of power between the DC link and the one of the storage device or the resistive element comprises controlling the switching module in a manner that directs power from the DC link to the resistive element.

13. A wind turbine system, comprising:
a wind-driven generator;
a power convertor coupled to the wind-driven generator, the power convertor including a rotor side converter, a line side converter and a DC link coupled between the rotor side and line side converters, the rotor side converter being configured to convert AC power to DC power and the line side converter being configured to convert DC power to AC power;
a selector switch coupled to the DC link; and
a switching module coupled to between the selector switch and the DC link, the switching module, when controlled, being configured to draw power from or transmit power to the DC link, the selector switch being configured to selectively couple the switching module to one of a storage device or a resistive element of the wind turbine system,
wherein the selector switch is movable between a first position, wherein the switching module is coupled to the storage device such that power is capable of being directed between the DC link and the storage device via control of the switching module, and a second position, wherein the switching module is coupled to the resistive element such that power is capable of being directed between the DC link and the resistive element via control of the switching module.

14. The wind turbine system of claim 13, further comprising a plurality of switching modules coupled to between the selector switch and the DC link, wherein, when the selector switch is in the first position, the plurality of switching modules are configured to be operated as a bi-directional DC-to-DC converter for controlling the flow of power to and from the storage device.

15. The wind turbine system of claim 13, wherein, when the selector switch is in the first position, the switching module is configured to be operated as a DC-to-DC converter for controlling the flow of power from the DC link to the storage device.

16. The wind turbine system of claim 13, wherein, when the selector switch is in the second position, the switching module is configured to be operated as a brake chopper for the resistive element.

17. The wind turbine system of claim 13, wherein the switching module comprises a switching element coupled between the DC link and the selector switch and a diode associated with the switching element.

18. The wind turbine system of claim 13, wherein the wind-driven generator comprises a doubly fed induction generator.

19. The wind turbine system of claim 13, wherein the storage device comprises at least one battery.

20. The wind turbine system of claim 13, further comprising a filter associated with the storage device.

* * * * *